United States Patent
Wong

(10) Patent No.: US 10,330,848 B2
(45) Date of Patent: Jun. 25, 2019

(54) LIGHT SOURCE MODULE

(71) Applicant: ChengFeng Optronics Corporation, Taichung (TW)

(72) Inventor: Ching-Fang Wong, Taichung (TW)

(73) Assignee: ChengFeng Optronics Corporation, Taichung (TW)

( * ) Notice: Subject to any disclaimer, the term of this patent is extended or adjusted under 35 U.S.C. 154(b) by 0 days.

(21) Appl. No.: 15/662,245

(22) Filed: Jul. 27, 2017

(65) Prior Publication Data

US 2018/0106948 A1  Apr. 19, 2018

Related U.S. Application Data

(60) Provisional application No. 62/408,063, filed on Oct. 14, 2016.

(30) Foreign Application Priority Data

Mar. 15, 2017  (CN) .......................... 2017 1 0151996

(51) Int. Cl.
*F21V 8/00* (2006.01)
*G02F 1/1335* (2006.01)

(52) U.S. Cl.
CPC .......... *G02B 6/0043* (2013.01); *G02B 6/005* (2013.01); *G02B 6/0036* (2013.01); *G02B 6/0088* (2013.01); *G02B 6/0051* (2013.01); *G02B 6/0053* (2013.01); *G02B 6/0055* (2013.01); *G02F 2001/133614* (2013.01)

(58) Field of Classification Search
USPC ........................................................ 362/607
See application file for complete search history.

(56) References Cited

U.S. PATENT DOCUMENTS

| 2015/0009453 A1* | 1/2015 | Cha ...................... G02B 6/0001 349/65 |
| 2016/0061417 A1* | 3/2016 | Kim .................. G02F 1/133603 349/62 |
| 2016/0097889 A1 | 4/2016 | Kim et al. |

FOREIGN PATENT DOCUMENTS

| CN | 103487857 | 1/2014 |
| CN | 105867019 | 8/2016 |
| TW | 201234646 | 8/2012 |
| TW | I463189 | 12/2014 |
| TW | I489178 | 6/2015 |
| TW | I498642 | 9/2015 |
| TW | I544257 | 8/2016 |

OTHER PUBLICATIONS

"Office Action of Taiwan Counterpart Application," dated Oct. 23, 2017, p.1-p. 8.

* cited by examiner

*Primary Examiner* — Matthew Mikels
(74) *Attorney, Agent, or Firm* — JCIPRNET

(57) ABSTRACT

A light source module including a light guide plate, a light source, and a quantum dot layer is provided. The light guide plate has a light emitting surface, a bottom surface, and a light incidence surface, wherein the bottom surface is opposite to the light emitting surface, and the light incidence surface connects the bottom surface and the light emitting surface. The light source is disposed beside the light incidence surface. The quantum dot layer is disposed on at least one of the light emitting surface and the bottom surface.

13 Claims, 10 Drawing Sheets

LM1

LIGHT SOURCE MODULE

CROSS-REFERENCE TO RELATED APPLICATION

This application claims the priority benefit of U.S. provisional application Ser. No. 62/408,063, filed on Oct. 14, 2016 and Chinese application serial no. 201710151996.X, filed on Mar. 15, 2017. The entirety of each of above-mentioned patent application is hereby incorporated by reference herein and made a part of this specification.

BACKGROUND OF THE INVENTION

1. Field of the Invention

The invention relates to a light source module, and more particularly, to a light source module having a quantum dot layer.

2. Description of Related Art

Quantum dot is a material having favorable light absorption and emission characteristics with narrow Full Width at Half-Maximum (FWHM), high luminous efficiency and considerable wide absorption spectrum for providing significantly high colorimetric purity and saturation. For those reasons, quantum dot elements have been applied in display technologies in recent years so image frames of display apparatus can provide wide color gamut and high color saturation. In the conventional art, the quantum dot elements are usually secured in a light source module through a frame securing mechanism. However, such approach not only increases assembling processes, but also increases an overall thickness of the light source module.

SUMMARY OF THE INVENTION

The invention provides a light source module, which is adapted to reduce the design of the frame securing mechanism, to reduce the assembling processes and to reduce the overall thickness of the light source module.

A light source module of the invention includes a light source module, a light source and a quantum dot layer. The light guide plate has a light emitting surface, a bottom surface, and a light incidence surface, wherein the bottom surface is opposite to the light emitting surface, and the light incidence surface connects the bottom surface and the light emitting surface. The light source is disposed beside the light incidence surface. The quantum dot layer is disposed on at least one of the light emitting surface and the bottom surface.

In an embodiment of the invention, the quantum dot layer directly contacts with the light emitting surface or the bottom surface, and a refractive index of the quantum dot layer is smaller than a refractive index of the light guide plate.

In an embodiment of the invention, the quantum dot layer includes a water and oxygen resistance substance.

In an embodiment of the invention, the quantum dot layer is formed with a plurality of microstructures.

In an embodiment of the invention, the quantum dot layer includes a plurality of light scattering particles.

In an embodiment of the invention, the light source module further includes an

In an embodiment of the invention, the light source module further includes an optical matching layer. The optical matching layer is disposed between the quantum dot layer and the light guide plate, and a refractive index of the optical matching layer is smaller than a refractive index of the light guide plate.

In an embodiment of the invention, a material of the optical matching layer comprises magnesium fluoride, polytetra-fluoro-ethylene, an optical adhesive or a metal oxide.

In an embodiment of the invention, the light source module further includes an isolation layer, wherein the quantum dot layer is disposed between the isolation layer and the light guide plate.

In an embodiment of the invention, the isolation layer further covers a sidewall surface of the quantum dot layer.

In an embodiment of the invention, the light source module further includes an isolation frame. The isolation frame covers a sidewall surface of the quantum dot layer.

In an embodiment of the invention, the isolation layer is formed with a plurality of microstructures.

In an embodiment of the invention, the isolation layer includes a plurality of light scattering particles.

In an embodiment of the invention, the light source module further includes a microstructure layer. The microstructure layer is disposed on the isolation layer.

In an embodiment of the invention, the bottom surface is formed with a plurality of microstructures.

In an embodiment of the invention, the light source module further includes a reflector, wherein the bottom surface is located between the light emitting surface and the reflector.

In an embodiment of the invention, the light source module further includes an adhesive layer, wherein the reflector is bonded with the light guide plate through the adhesive layer, and a refractive index of the adhesive layer is smaller than a refractive index of the light guide plate.

Based on the above, in the light source module according to the embodiments of the invention, since the quantum dot layer is disposed on the light guide plate, the design of the frame securing mechanism and the assembling processes of the light source module can be reduced, and the overall thickness of the light source module can also be reduced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
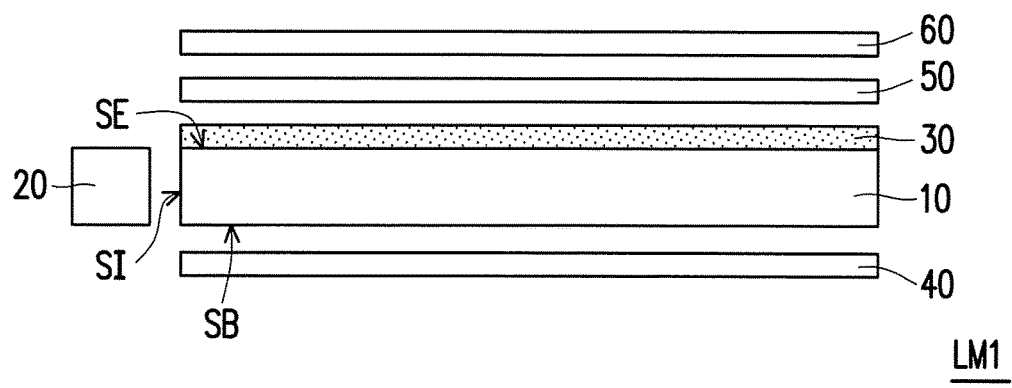
FIG. 1 to FIG. 19 are schematic diagrams illustrating a light source module according to embodiments of the invention.

FIG. 1 to FIG. 19 are schematic diagrams illustrating a light source module according to embodiments of the invention. With reference to FIG. 1, a light source module LM1 includes a light guide plate 10, a light source 20 and a quantum dot layer 30. The light guide plate 10 is adapted to transmit a light beam from the light source 20, and a material of the light guide plate 10 can be a glass or a plastic. The plastic can include Poly-Methyl-Meth-Acrylate (PMMA) or polycarbonate (PC), but the invention is not limited thereto.

The light guide plate 10 has a light emitting surface SE, a bottom surface SB, and a light incidence surface SI. The bottom surface SB is opposite to the light emitting surface SE, and the light incidence surface SI connects the bottom surface SB and the light emitting surface SE. The light guide plate 10 may be a light guide plate of any type. For instance, the light guide plate 10 may be a flat light guide plate as depicted in FIG. 1, wherein the bottom surface SB thereof is parallel to the light emitting surface SE, and the light incident surface SI is perpendicular to the bottom surface SB and the light emitting surface SE, but the invention is not limited thereto. In another embodiment, the light guide plate 10 may also be a wedge-shape light guide plate, wherein the bottom surface SB thereof is tilted to the light emitting surface SE, and the light incident surface SI is not perpendicular to the bottom surface SB. In all the following embodiments below, the light guide plate 10 is illustrated using the flat light guide plate, but a modification may also be made to use the light guide plate of other type (e.g. the wedge-shape light guide plate) instead, and said modification is not repeated hereinafter.

The light source 20 is disposed beside the light incident surface SI, and the light source 20 is adapted to emit a light beam towards the light incident surface SI. The light source 20 can include a plurality of light-emitting diodes, such as LEDs or laser diodes. Further, the light-emitting diodes may be single-color light-emitting diodes or multi-color light-emitting diodes. In other words, the light beam may be a light beam or a laser beam, and the light beam may also be a single-color light beam or a multiple-color light beam.

After entering the light guide plate 10 through the light incident surface SI, the light beam from the light source 20 is transmitted inside the light guide plate 10 through the total internal reflection (TIR). The bottom surface SB of the light guide plate 10 can be disposed with a plurality of microstructures (e.g., V-shape grooves or mesh points, which are not illustrated in FIG. 1) to break the total internal reflection such that the light beam can be emitted outside from the light emitting surface SE. A light pattern emitted from the light emitting surface SE may be controlled by modulating a shape and a distribution of the microstructures.

The light source module LM1 can further include a reflector 40. The reflector 40 is disposed below the bottom surface SB, and the bottom surface SB is located between the light emitting surface SE and the reflector 40 so the light beam emitted from the bottom surface SB can be reflected back to the light guide plate 10 to improve the utilization rate of light.

The quantum dot layer 30 is disposed on a transmission path of the light beam. For instance, the quantum dot layer 30 can be disposed on at least one of the light emitting surface SE and the bottom surface SB to absorb a part of said light beam and thus excite a light beam with another wavelength (color). The wavelength of the excited light beam is related to a particle size of quantum dots. In the present embodiment, the quantum dots in the quantum dot layer 30 can include single or multiple particle sizes. In other words, a light beam with single or multiple colors can be excited from the quantum dot layer 30. For instance, the light beam outputted by the light source 20 may be a blue light, and the quantum dot layer 30 can absorb a part of the blue light and turn it into a red light and a green light, but the invention is not limited thereto.

In addition to the quantum dots, the quantum dot layer 30 can further include a base layer, and the quantum dots are distributed within the base layer. The quantum dot layer 30 can be directly formed on the light emitting surface SE by coating or inkjet printing. In other words, the quantum dot layer 30 can directly contact with the light guide plate 10 (the light emitting surface SE) without other film-layers disposed between the quantum dot layer 30 and the light guide plate 10. Under this architecture, a refractive index of the quantum dot layer 30 (e.g., a refractive index of the base layer) is smaller than a refractive index of the light guide plate 10 so the light beam can be transmitted inside the light guide plate 10 through the total internal reflection. However, the invention is not limited to the above. In other embodiments, the quantum dot layer 30 may be disposed on the bottom surface SB. Alternatively, the quantum dot layer 30 may also be disposed on the light emitting surface SE and the bottom surface SB. Furthermore, other film-layers may also be disposed between the quantum dot layer 30 and the light guide plate 10. For instance, the quantum dot layer 30 can be formed on a thin film in advance and then attached to the light guide plate 10, but the invention is not limited thereto.

Based on different requirements, the quantum dot layer 30 may further include other materials. For instance, to reduce deterioration of the quantum dots caused by moisture and oxygen, the quantum dot layer 30 can further include a water and oxygen resistance substance, but the invention is not limited thereto.

In comparison with the quantum dot elements secured through the frame securing mechanism, by disposing the quantum dot layer 30 on the light guide plate 10 as described in the present embodiment, in addition to reduction of the design of the frame securing mechanism and the assembling processes, the overall thickness of the light source module LM1 can also be reduced.

Based on different requirements, the light source module LM1 may further include other elements. For instance, the light guide plate 10 can further include at least one diffuser 50 and at least one prim sheet 60. The diffuser 50 and the prism sheet 60 are sequentially stacked above the light emitting surface SE. In other embodiments, at least one of the diffuser 50 and the prism sheet 60 can be omitted. All the following embodiments below can adopt this modification, which is not repeated hereinafter.

Other possible implementations of the light source module are described with reference to FIG. 2 to FIG. 19 below, where the identical or similar elements are marked with identical or similar reference numbers, which are not repeated hereinafter.

Figure 2:
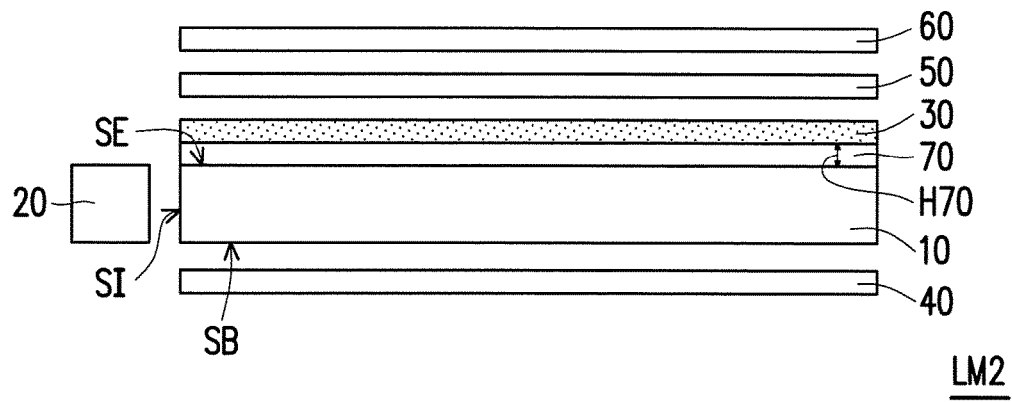

With reference to FIG. 2, a light source module LM2 is similar to the light source module LM1 of FIG. 1. The major difference between the two is described as follows. The light source module LM2 further includes an optical matching layer 70. The optical matching layer 70 is disposed between the quantum dot layer 30 and the light guide plate 10. Under this architecture, it is not mandatory to restrict the refractive index of the quantum dot layer 30, but a refractive index of the optical matching layer 70 needs to be smaller than the refractive index of the light guide layer 10 so the light beam can be transmitted inside the light guide layer 10 through the total internal reflection. Specifically, the optical matching layer 70 may have the refractive index between 1 and 1.4, and a thickness H70 greater than, for example, 1 μm. For instance, a material of the optical matching layer 70 can include magnesium fluoride ($MgF_2$), Poly-Tetra-Fluoro-Ethylene (PTFE) or an optical adhesive. Alternatively, the material of the optical matching layer 70 may be other high-molecular materials, which can be coated onto the light guide plate 10 with a plurality of nano-holes provided in the layer. Alternatively, the material of the optical matching layer 70 can include other insulation material or metal oxide and include a plurality of nanometer pore structures.

Figure 3:
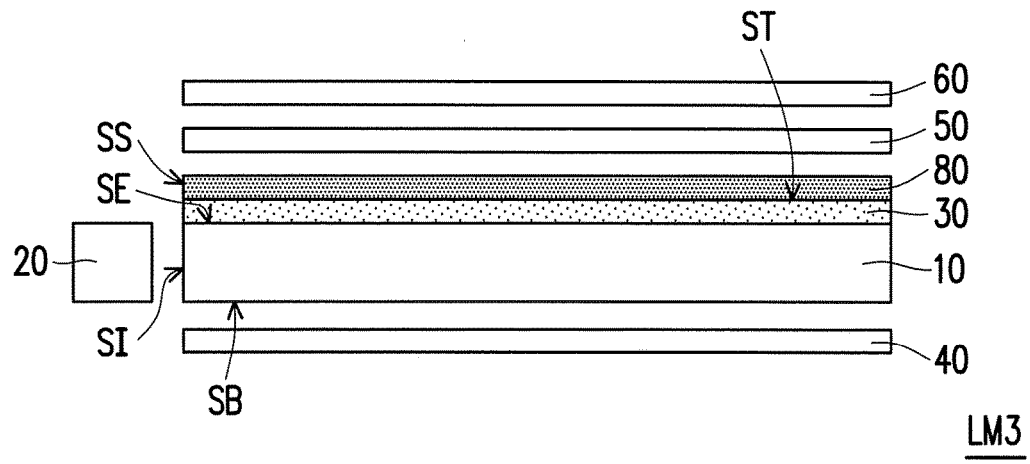

With reference to FIG. 3, a light source module LM3 is similar to the light source module LM1 of FIG. 1. The major difference between the two is described as follows. The light source module LM3 further includes an isolation layer 80, wherein the quantum dot layer 30 is disposed between the isolation layer 80 and the light guide plate 10. The isolation layer 80 is adapted to protect the quantum dot layer 30, which can be further used to block moisture and oxygen in addition to functions of scratch-proof, wear-proof, etc. In this way, it is not necessarily for the quantum dot layer 30 to include the water and oxygen resistance substance. For instance, a material of the isolation layer 80 can include a transparent material with high gas barrier properties, such as Poly-Vinyli-Dene Chloride (PVDC), ethylene-vinyl alcohol copolymers (EVOH), polyvinyl alcohol (PVA), metal thin films (e.g., aluminum foil and evaporation coating), silicon oxide, silicon nitride, aluminum oxide evaporation coating or nylon nanocomposite material, but the invention is not limited to the above.

Figure 4:
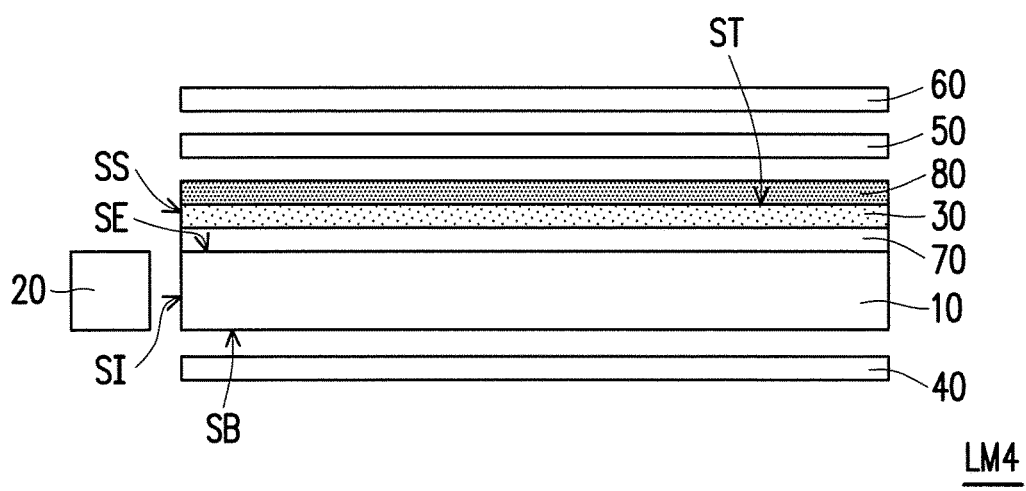

With reference to FIG. 4, a light source module LM4 is similar to the light source module LM2 of FIG. 2. The major difference between the two is described as follows. The light source module LM4 further includes the isolation layer 80. Related content regarding the isolation layer 80 can refer to the corresponding description for FIG. 3, which is not repeated hereinafter.

Figure 5:
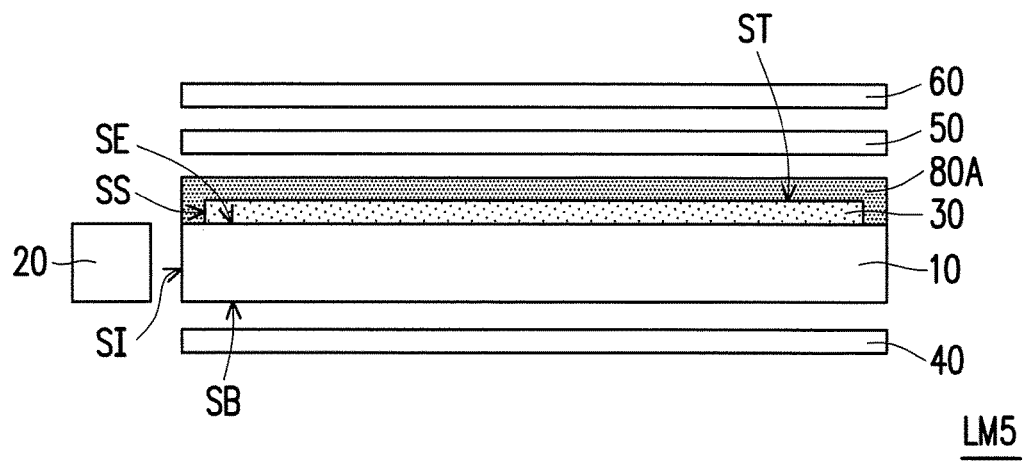

With reference to FIG. 5, a light source module LM5 is similar to the light source module LM3 of FIG. 3. The major difference between the two is described as follows. In the light source module LM3, the isolation layer 80 covers a top surface ST of the quantum dot layer 30 and exposes a sidewall surface SS of the quantum dot layer 30. In the light source module LM5, an isolation layer 80A not only covers the top surface ST of the quantum dot layer 30 but also covers the sidewall surface SS of the quantum dot layer 30.

Figure 6:
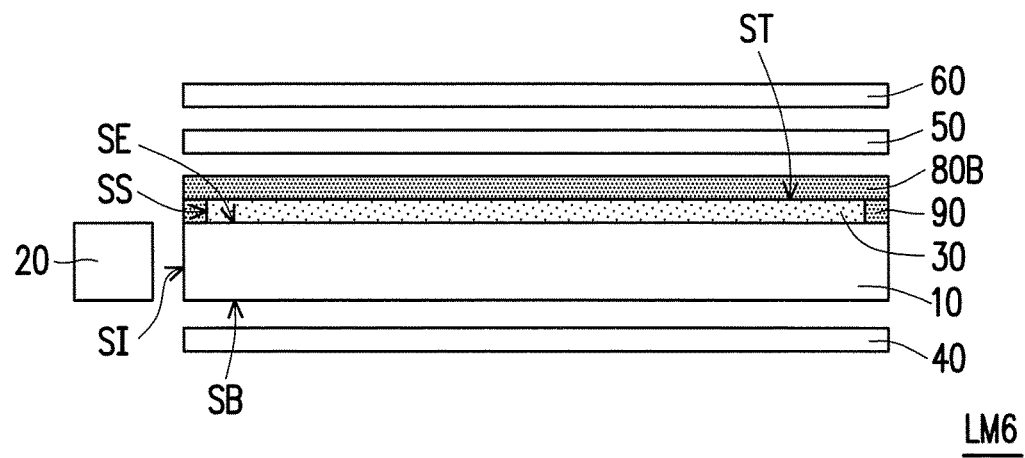

With reference to FIG. 6, a light source module LM6 is similar to the light source module LM3 of FIG. 3. The major difference between the two is described as follows. The light source module LM6 further includes an isolation frame 90. The isolation frame 90 covers the sidewall surface SS of the quantum dot layer 30, and an isolation layer 80B covers the top surface ST of the quantum dot layer 30 and the isolation frame 90. Specifically, the isolation frame 90 may be fabricated by an isolation material in advance. Then, a quantum dot material may be disposed in the isolation frame 90 by coating or inkjet printing to form the quantum dot layer 30. Subsequently, the isolation layer 80B is formed on the quantum dot layer 30 and the isolation frame 90, wherein the isolation frame 90 and the isolation layer 80B can adopt the same or different isolation materials.

Figure 7:
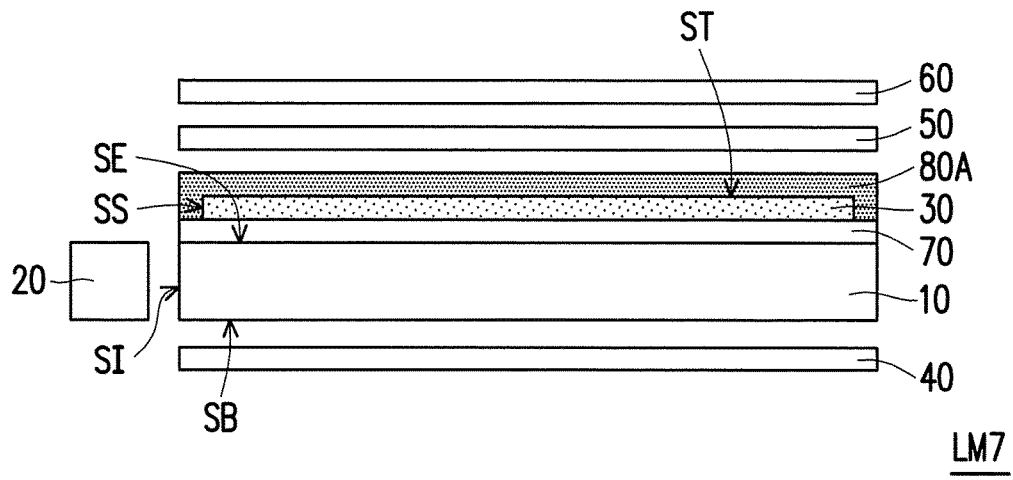

With reference to FIG. 7, a light source module LM7 is similar to the light source module LM5 of FIG. 5. The major difference between the two is described as follows. The light source module LM7 further includes the optical matching layer 70. Related content regarding the optical matching layer 70 can refer to the corresponding description for FIG. 2, which is not repeated hereinafter.

Figure 8:
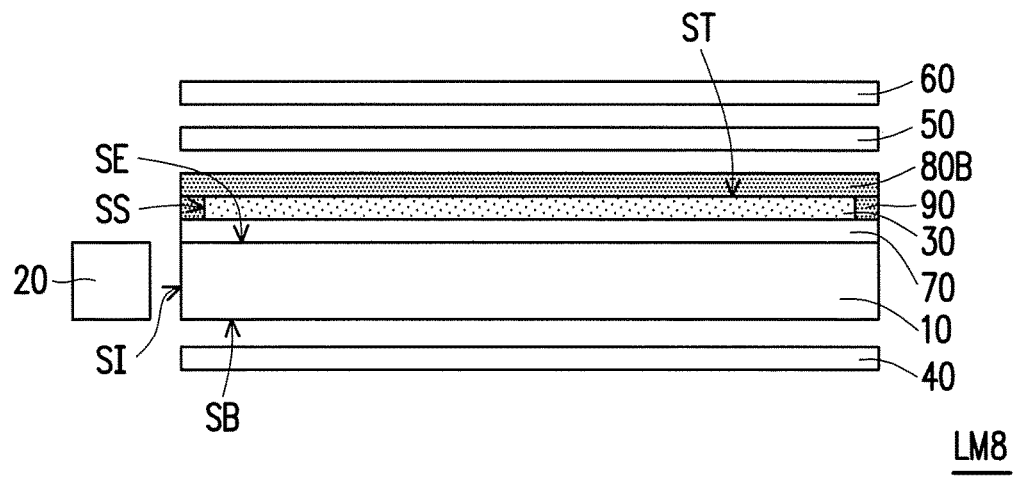

With reference to FIG. 8, a light source module LM8 is similar to the light source module LM6 of FIG. 6. The major difference between the two is described as follows. The light source module LM8 further includes the optical matching layer 70. Related content regarding the optical matching layer 70 can refer to the corresponding description for FIG. 2, which is not repeated hereinafter.

Figure 9:
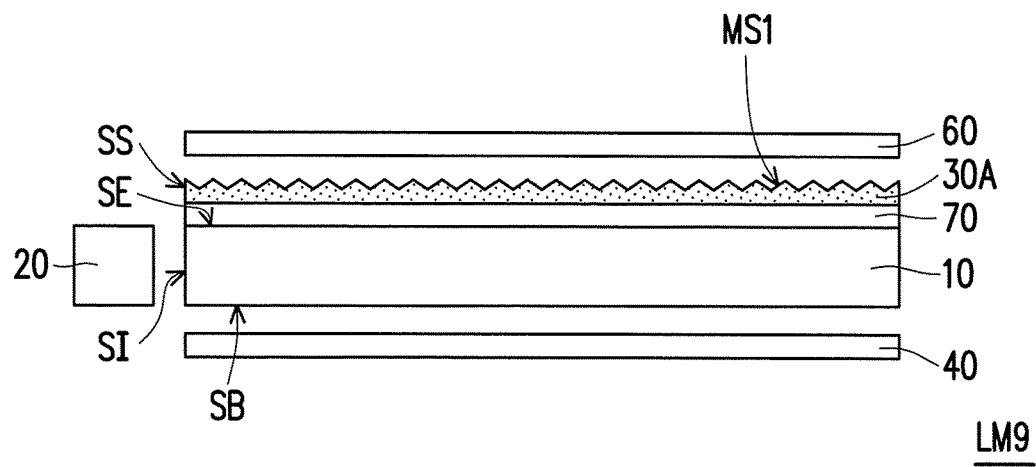

With reference to FIG. 9, a light source module LM9 is similar to the light source module LM2 of FIG. 2. The major difference between the two is described as follows. In the light source module LM9, a quantum dot layer 30A is formed with a plurality of microstructures MS1. The microstructures MS1 may be fabricated by lithography process or stamping, for example. Based on different design requirements, the microstructures MS1 may include different shapes or arrangement spacings rather than being limited by what illustrated in FIG. 9. In the present embodiment, the microstructures MS1 may be used for scattering the light beam emitted from the light guide plate 10 so as to improve the unifoirmity of light. Accordingly, in the light source module LM9, the number of diffusers may be reduced, or the diffuser 50 shown in FIG. 2 may be omitted. In addition, under the architecture of the present embodiment, if a refractive index of the quantum dot layer 30A is smaller than the refractive index of the light guide plate 10, the optical matching layer 70 may also be omitted.

Figure 10:
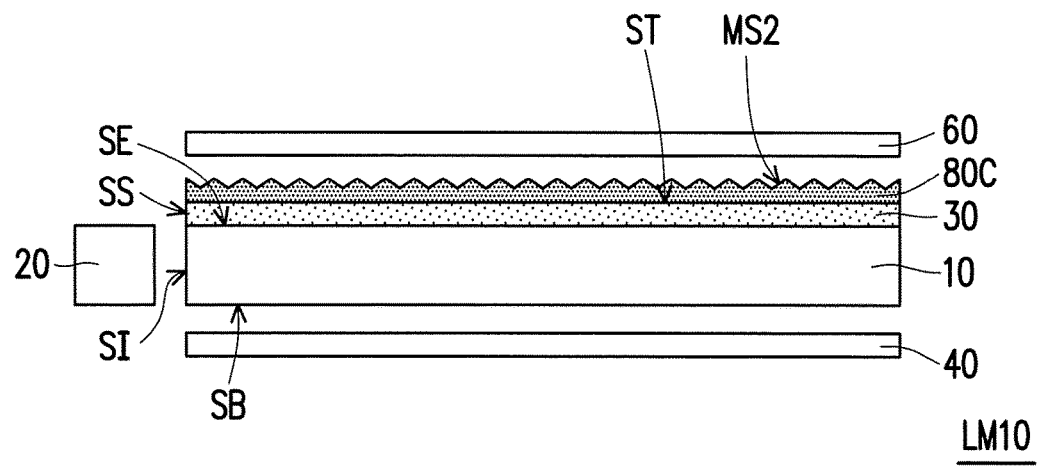

With reference to FIG. 10, a light source module LM10 is similar to the light source module LM3 of FIG. 3. The major difference between the two is described as follows. In the light source module LM10, an isolation layer 80C is formed with a plurality of microstructures MS2. The microstructures MS2 may be fabricated by lithography process or stamping, for example. Based on different design requirements, the microstructures MS2 may include different shapes or arrangement spacings rather than being limited by what illustrated in FIG. 10. In the present embodiment, the microstructures MS2 may be used for scattering the light beam emitted from the light guide plate 10 so as to improve the uniformity of light. Accordingly, in the light source module LM10, the number of diffusers may be reduced, or the diffuser 50 shown in FIG. 3 may be omitted.

In the present embodiment, the isolation layer 80C covers the top surface ST of the quantum dot layer 30 and exposes the sidewall surface SS of the quantum dot layer 30. Nonetheless, in another embodiment, the isolation layer 80C can further cover the sidewall surface SS of the quantum dot layer 30. Alternatively, the light source module LM10 can further include the isolation frame 90 shown in FIG. 6 to cover the sidewall surface SS of the quantum dot layer 30.

Figure 11:
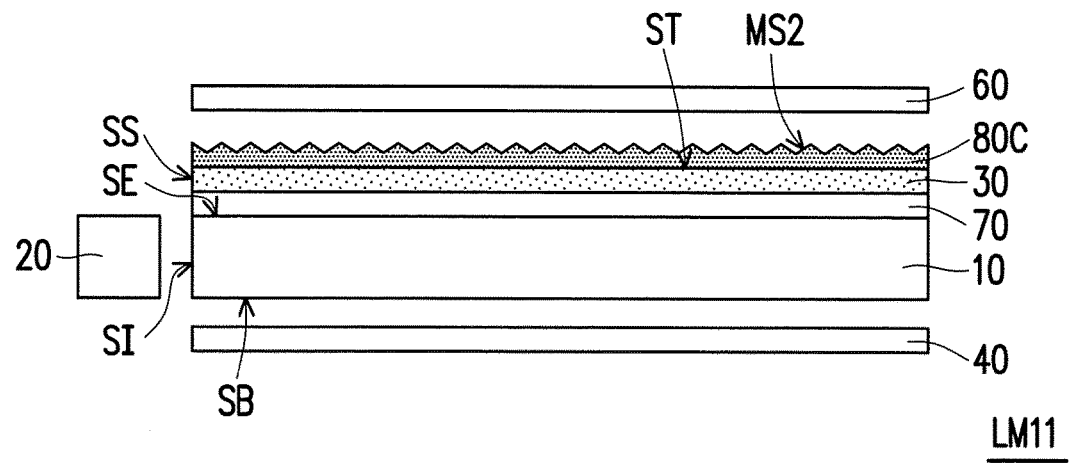

With reference to FIG. 11, a light source module LM11 is similar to the light source module LM4 of FIG. 4. The major difference between the two is described as follows. In the light source module LM11, the isolation layer 80C is formed with the microstructures MS2. Related content regarding the isolation layer 80C can refer to the corresponding description for FIG. 10, which is not repeated hereinafter.

Figure 12:
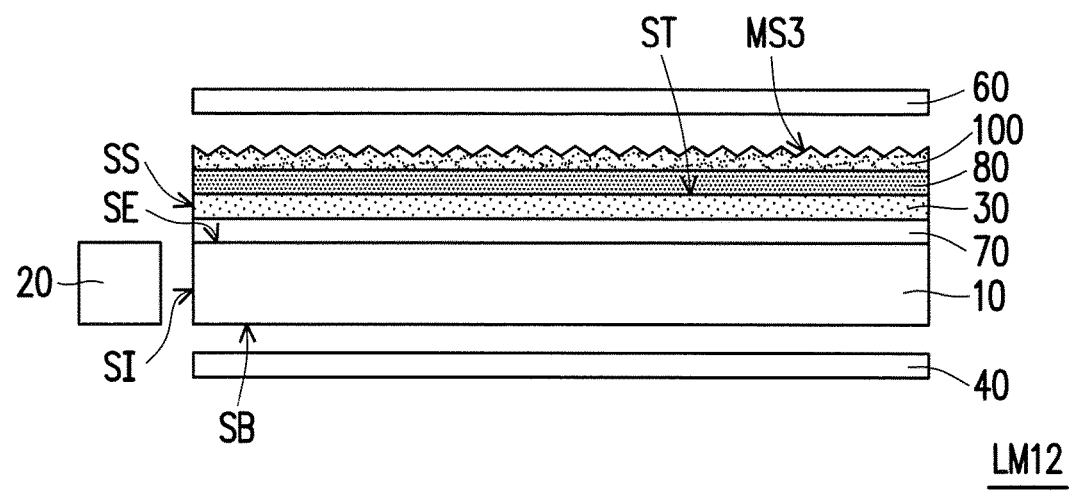

With reference to FIG. 12, a light source module LM12 is similar to the light source module LM4 of FIG. 4. The major difference between the two is described as follows. The light source module LM12 further includes a microstructure layer 100. The microstructure layer 100 is disposed on the isolation layer 80 and includes a plurality of microstructures MS3. The microstructure layer 100 may be fabricated by screen printing mesh points or stamping microstructures, for example. Based on different design requirements, the microstructures MS3 may include different shapes or arrangement spacings rather than being limited by what illustrated in FIG. 12. In the present embodiment, the microstructures MS3 may be used for scattering the light beam emitted from the light guide plate 10 so as to improve the uniformity of light. Accordingly, in the light source module LM12, the number of diffusers may be reduced, or the diffuser 50 shown in FIG. 4 may be omitted.

Figure 13:
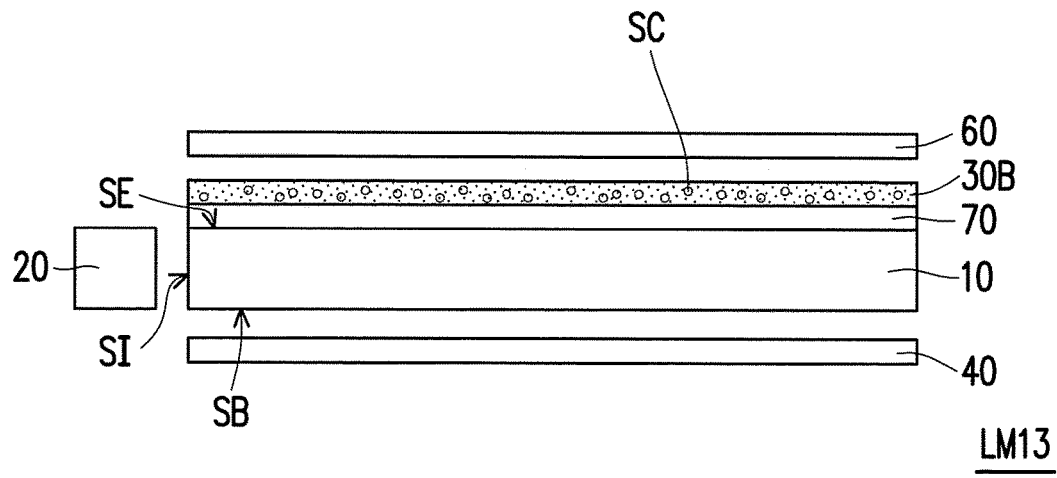

With reference to FIG. 13, a light source module LM13 is similar to the light source module LM2 of FIG. 2. The major difference between the two is described as follows. In the light source module LM13, a quantum dot layer 30B further includes a plurality of light scattering particles SC. The light scattering particles SC are adapted for scattering the light beam emitted from the light guide plate 10 so as to improve the uniformity of light. Accordingly, in the light source module LM13, the number of diffusers may be reduced, or the diffuser 50 shown in FIG. 2 may be omitted. In addition, under the architecture of the present embodiment, if a refractive index of the quantum dot layer 30B is smaller than the refractive index of the light guide plate 10, the optical matching layer 70 may also be omitted.

Figure 14:
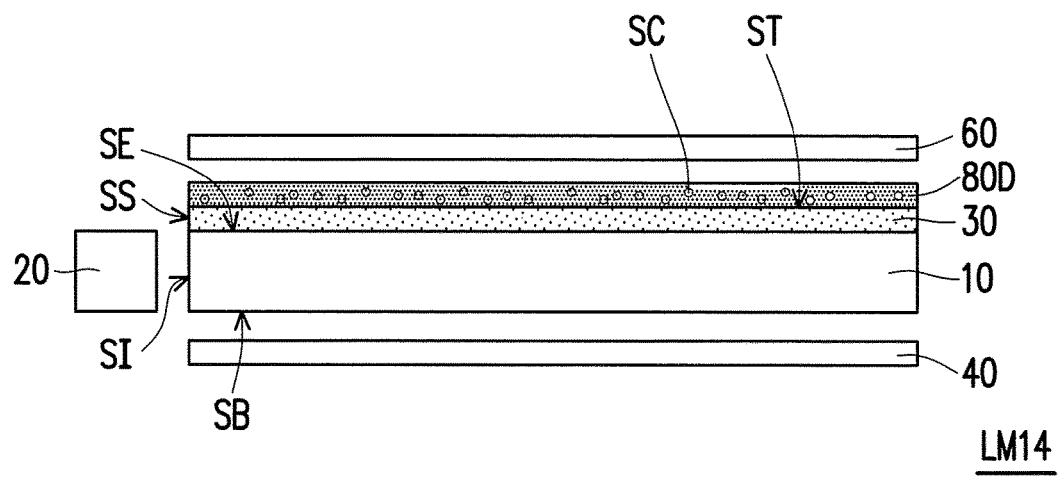

With reference to FIG. 14, a light source module LM14 is similar to the light source module LM3 of FIG. 3. The major difference between the two is described as follows. In the light source module LM14, an isolation layer 80D further includes the light scattering particles SC. The light scattering particles SC are adapted for scattering the light beam emitted from the light guide plate 10 so as to improve the uniformity of light. Accordingly, in the light source module LM14, the number of diffusers may be reduced, or the diffuser 50 shown in FIG. 3 may be omitted.

In the present embodiment, the isolation layer 80D covers the top surface ST of the quantum dot layer 30 and exposes the sidewall surface SS of the quantum dot layer 30. Nonetheless, in another embodiment, the isolation layer 80D can further cover the sidewall surface SS of the quantum dot layer 30. Alternatively, the light source module LM14 can further include the isolation frame 90 shown in FIG. 6 to cover the sidewall surface SS of the quantum dot layer 30.

Figure 15:
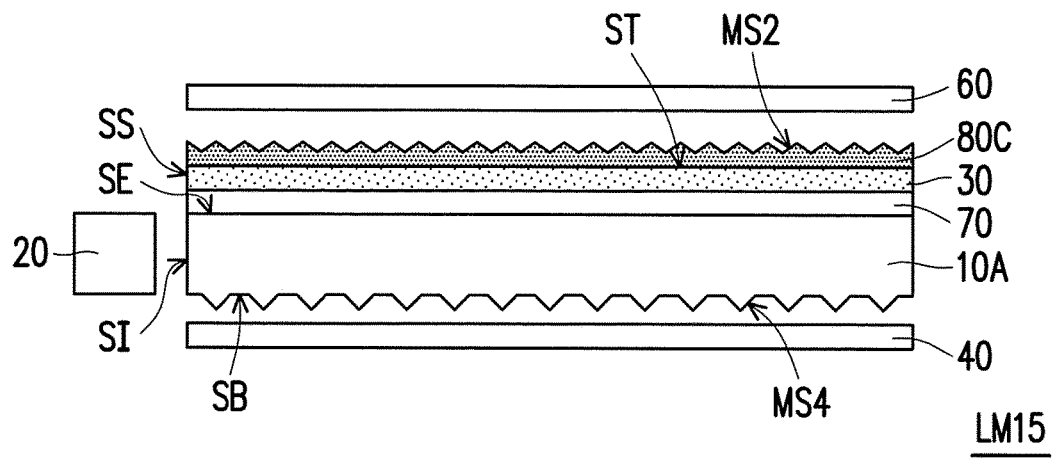

With reference to FIG. 15, a light source module LM15 is similar to the light source module LM11 of FIG. 11. The major difference between the two is described as follows. In the light source module LM15, the bottom surface SB of a light guide plate 10A is formed with a plurality of microstructures MS4. Based on different design requirements, the microstructures MS4 may include different shapes or arrangement spacings rather than being limited by what illustrated in FIG. 15. In addition, it should be noted that, the bottom surface SB of the light guide plate 10 may also optionally formed with the microstructures MS4 in other embodiments, but the invention is not limited thereto.

Figure 16:
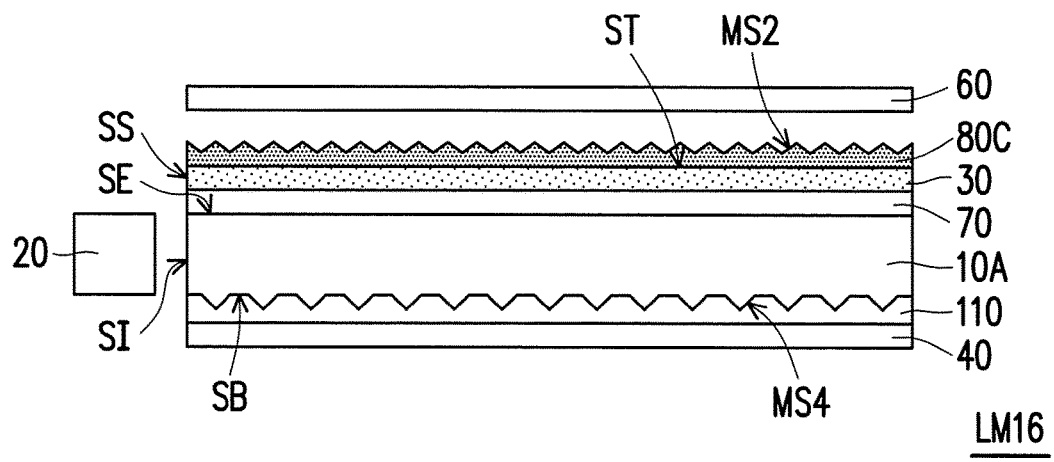

With reference to FIG. 16, a light source module LM16 is similar to the light source module LM15 of FIG. 15. The major difference between the two is described as follows. The light source module LM16 further includes an adhesive layer 110, wherein the reflector 40 is bonded with the light guide plate 10 through the adhesive layer 110. Under this architecture, a refractive index of the adhesive layer 110 is smaller than the refractive index of the light guide plate 10 so the light beam can be transmitted inside the light guide plate 10 through the total internal reflection. It should be noted that, the reflector 40 may also be bonded with the light guide plate 10 through the adhesive layer 110 in other embodiments, but the invention is not limited thereto.

Figure 17:
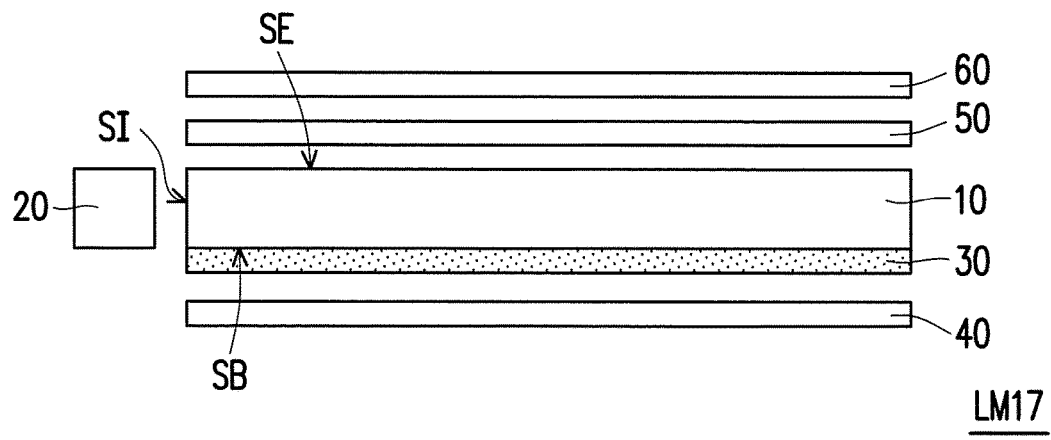

With reference to FIG. 17, a light source module LM17 is similar to the light source module LM1 of FIG. 1. The major difference between the two is described as follows. In the light source module LM17, the quantum dot layer 30 is disposed on the bottom surface SB of the light guide plate 10 so the quantum dot layer 30 is located between the light guide plate 10 and the reflector 40. The embodiments of FIG. 2 to FIG. 15 can also adopt this modification. Taking FIG. 4 for example, the optical matching layer 70, the quantum dot layer 30 and the isolation layer 80 can be sequentially disposed on the bottom surface SB. Further, in the case where the reflector 40 is bonded with the light guide plate 10 through the adhesive layer 110 (referring to FIG. 16), the optical matching layer (if any), the quantum dot layer and the isolation layer (if any) may be sequentially disposed on the bottom surface SB before the reflector 40 is bonded with the light guide plate 10 through the adhesive layer 110.

Figure 18:
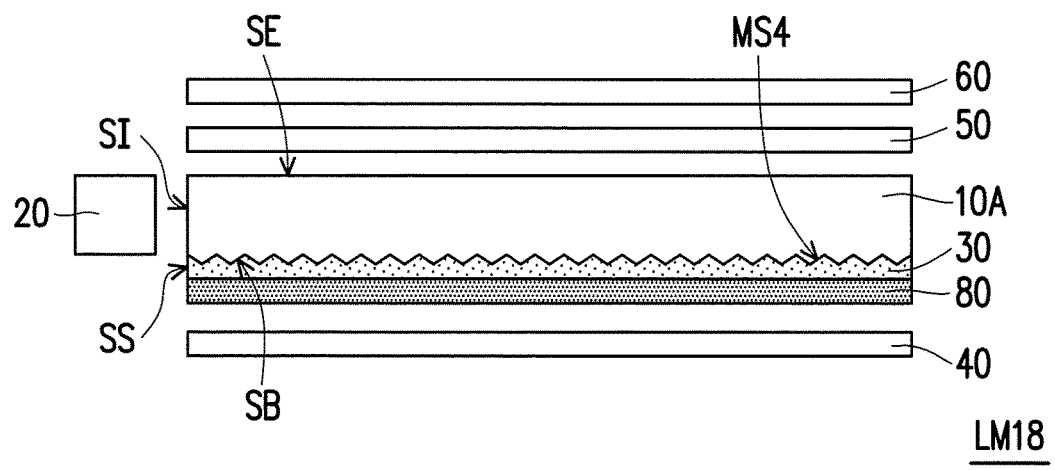

With reference to FIG. 18, a light source module LM18 is similar to the light source module LM17 of FIG. 17. The major difference between the two is described as follows. In the light source module LM18, the bottom surface SB of the light guide plate 10A is formed with the microstructures MS4. The quantum dot layer 30 is disposed on the bottom surface SB of the light guide plate 10A. The light source module LM18 further includes the isolation layer 80. The isolation layer 80 is disposed on the quantum dot layer 30, and the quantum dot layer 30 is located between the light guide plate 10A and the isolation layer 80. Related content regarding the isolation layer 80 can refer to the corresponding description for FIG. 3, which is not repeated hereinafter. In the present embodiment, the isolation layer 80 exposes the sidewall surface SS of the quantum dot layer 30. Nonetheless, in another embodiment, the isolation layer 80 can cover the sidewall surface SS of the quantum dot layer 30. Alternatively, the light source module LM18 can further include the isolation frame 90 shown in FIG. 6 to cover the sidewall surface SS of the quantum dot layer 30.

Figure 19:
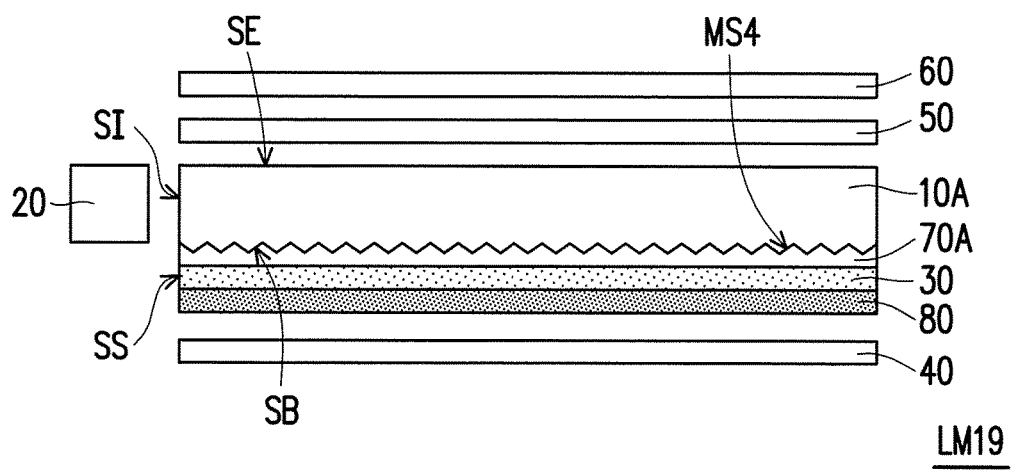

With reference to FIG. 19, a light source module LM19 is similar to the light source module LM18 of FIG. 18. The major difference between the two is described as follows. The light source module LM19 further includes an optical matching layer 70A. The optical matching layer 70A is disposed between the quantum dot layer 30 and the light guide plate 10. Related content regarding the optical matching layer 70A can refer to the corresponding description for FIG. 2, which is not repeated hereinafter. In the present embodiment, the isolation layer 80 exposes the sidewall surface SS of the quantum dot layer 30. Nonetheless, in another embodiment, the isolation layer 80 can cover the sidewall surface SS of the quantum dot layer 30. Alternatively, the light source module LM19 can further include the isolation frame 90 shown in FIG. 6 to cover the sidewall surface SS of the quantum dot layer 30.

In summary, in the light source module according to the embodiments of the invention, since the quantum dot layer is disposed on the light guide plate, the design of the frame securing mechanism and the assembling processes can be reduced, and the overall thickness of the light source module can also be reduced.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A light source module, comprising:
   a light guide plate, having a light emitting surface, a bottom surface, and a light incidence surface, wherein the bottom surface is opposite to the light emitting surface, and the light incidence surface connects the bottom surface and the light emitting surface;
   a light source, disposed beside the light incident surface;
   an isolation layer;

a quantum dot layer, disposed between the isolation layer and the light guide plate, on at least one of the light emitting surface and the bottom surface; and an isolation frame, covering a sidewall surface of the quantum dot layer that is perpendicular to the light emitting surface, wherein the isolation layer covers the isolation frame and a top surface of the quantum dot layer, wherein a top surface of the isolation frame is flush with the top surface of the quantum dot layer.

2. The light source module according to claim 1, wherein the quantum dot layer directly contacts with the light emitting surface or the bottom surface, and a refractive index of the quantum dot layer is smaller than a refractive index of the light guide plate.

3. The light source module according to claim 2, wherein the quantum dot layer comprises a water and oxygen resistance substance.

4. The light source module according to claim 2, wherein the quantum dot layer is formed with a plurality of microstructures.

5. The light source module according to claim 2, wherein the quantum dot layer comprises a plurality of light scattering particles.

6. The light source module according to claim 1, further comprising:

an optical matching layer, disposed between the quantum dot layer and the light guide plate, and a refractive index of the optical matching layer is smaller than a refractive index of the light guide plate.

7. The light source module according to claim 6, wherein a material of the optical matching layer comprises magnesium fluoride, poly-tetra-fluoro-ethylene, an optical adhesive or a metal oxide.

8. The light source module according to claim 1, wherein the isolation layer is formed with a plurality of microstructures.

9. The light source module according to claim 1, wherein the isolation layer comprises a plurality of light scattering particles.

10. The light source module according to claim 1, further comprising:

a microstructure layer, disposed on the isolation layer.

11. The light source module according to claim 1, wherein the bottom surface is formed with a plurality of microstructures.

12. The light source module according to claim 1, further comprising:

a reflector, wherein the bottom surface is located between the light emitting surface and the reflector.

13. The light source module according to claim 12, further comprising:

an adhesive layer, wherein the reflector is bonded with the light guide plate through the adhesive layer, and a refractive index of the adhesive layer is smaller than a refractive index of the light guide plate.

* * * * *